Patented Aug. 8, 1944

2,355,097

UNITED STATES PATENT OFFICE 2,355,097

OAT EXTRACT USEFUL FOR ADDITION TO FOODS FOR ANTIOXIDANT AND OTHER PURPOSES

Sidney Musher, New York, N. Y., assignor to Musher Foundation Incorporated, New York, N. Y., a corporation of New York No Drawing. Application January 8, 1941,
Serial No. 373,608

10 Claims. (Cl. 99—150)

The present invention relates to the extraction of oats and it also relates to the use of such extract for addition to oxidizable foodstuffs, particularly for fortifying same against oxidative deterioration as well as for other purposes.

Although not restricted thereto, the present invention will be particularly described in this application to the extraction of whole oats or residue materials obtained therefrom and particularly the hard, non-starchy portions of oats.

It is among the objects of the present invention to produce an improved oat extract particularly suitable for addition to food products as well as to other organic oxidizable compositions which extract may be readily produced at low cost and which may be used for addition or admixture with such oxidizable foods without giving any undesirable flavors, tastes, and/or odors thereto.

Another object is to provide an enhanced oat extract which may be readily obtained from whole oats or non-starchy oat residues and which will be largely devoid of undesirable constituents such as coagulated proteins and other undesirable non-effective materials.

It is among the other objects of the present invention to produce an improved water soluble oat extract useful for addition to foodstuffs which will have enhanced antioxidant activity and which will at the same time be devoid of tendency to form a jelly-like mass with a rather unpleasant taste and which will be readily miscible with clear aqueous food compositions without leaving any undesirable coagulated residues in the food product undergoing treatment for oxidative deterioration.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found most satisfactory to extract the whole oats or the hard non-starchy residues of the whole oats with water and then to treat such extract with alcohol or other similar water miscible organic solvent with or without an intermediate concentration and with removal of the coagulated insoluble residues obtained as a result of the alcohol purification procedure.

The final product which is obtained first by water extraction and then by alcohol purification is, after removal of the alcohol from the final filtered product and concentration, relatively bland, is free of coagulated undesirable residues and may readily be admixed with oxidizible food compositions and particularly with aqueous oxidizable food compositions without leaving any undesirable residues in the food composition undergoing treatment.

At the same time, the extract thus obtained following alcohol purification is a relatively free flowing viscous material which does not become jelly-like as characteristic of the concentrated water extract and the objections of the water extract have been largely overcome by the alcohol purification steps outlined in the present invention.

The oats or non-starchy residues obtained therefrom used for the first water extraction are desirably finely divided and admixed with from about 4 parts to 9 parts of water to each 1 part of oats. After the mixture is made the pH is adjusted with an acid such as sulfuric, hydrochloric or lactic acid to about between a pH of 3.5 and 5.5 and preferably to between 4.0 and 4.5. The temperature of the water and oats should be raised to between about 100° F. and 130° F. and preferably to between about 120° F. and 125° F.

The oats and water at the desired pH and temperature are agitated thoroughly for approximately between 5 minutes and 1 hour and desirably for a period of about 20 minutes to 30 minutes following which the mixture is allowed to cool or preferably cooled as rapidly as possible.

The mixture may then either be allowed to settle, filtered or centrifuged to remove the water insoluble fibers or residues and the clear liquor is further desirably cooled to a temperature of under 80° F.

Although this liquor may, where desired, be directly treated with alcohol such as with methanol, ethanol or iso-propyl alcohol, it preferably is first concentrated to about between 45% and 65% total solids in a vacuum evaporator at a temperature of less than 125° F. and under not less than 22 inches of vacuum.

This concentrate may then again be adjusted with an acid so that the pH will be about between 3.5 and 5.0 and it then is mixed with between about 4 parts and 8 parts of an alcohol water mixture to each part of the total solids of the concentrated water extract.

It has been found desirable to utilize for the combination of methanol or iso-propyl alcohol and water about between 50% alcohol and 50% water and 80% alcohol and 20% water. Preferably, however, there is employed about 60% alcohol and 40% water and it has been found particularly desirable to utilize either methanol or iso-propyl alcohol in combination with water for this purpose.

The amount of water present in the concentrated water extract is taken into consideration in preparing the combination of the water extract with the alcohol water mixture and it has been found preferable for there to be utilized about 7 parts of the total alcohol water mixture for each part of the total solids of the concentrated water extract.

It has also been found desirable for the alcohol water mixture to first be made up and for the concentrated water extract to be added to this alcohol water mixture while stirring at room temperature. A flocculent precipitate is immediately formed and this precipitate is particularly easily settled out when the alcohol amounts to about 80% and the water amounts to 20% of the total combination. Where a 60% alcohol and 40% water mixture is employed, although an immediate precipitate is formed, the precipitate thus formed does not appear readily to settle out and the product is filtered with much more difficulty than where about 80% alcohol and 20% water is employed.

The mixture of the alcohol-water combination with the concentrated water extract is then stirred continuously for about 5 minutes to 30 minutes and the mixture is allowed to stand to remove the clear portion or the mixture is filtered or centrifuged to remove the undissolved residues. It has been found desirable at the time of adding the concentrated water extract to the alcohol mixture for the pH again to be checked and for this pH to be retained at about between 3.5 and 5 and preferably a pH of about 4.5 is employed throughout the entire operation, adding sufficient acid to maintain a pH of not over about 4.5.

The filtered or centrifuged alcohol water mixture made following purification of the concentrated water extract is then evaporated in a vacuum pan at a temperature of not in excess of 135° F. and under not less than about 22 inches of barometric pressure to approximately 70% to 80% total solids.

The partially or fully condensed extract thus obtained may be further purified by adding it to another lot of an alcohol-water mixture, preferably to 7 parts of a 60-40 to 80-20 mixture of methanol or iso-propanol and water to each part of the extract solids, followed by removal of the insoluble residues again formed and evaporation and concentration to 70% to 80% total solids.

This extract may, where desired, then be adjusted to a pH of about 5.0 to 5.5 and preferably to a pH of between 5.2 and 5.3 although this pH adjustment is not entirely necessary. Where the pH is adjusted, however, the extract may be filtered through cheese cloth or other filtering material and this filtrate may again be treated with an additional quantity of the methanol water mixture followed by agitation, filtration and evaporation in order to obtain a more brilliant and more clear filtrate and extract.

The extract thus obtained is a rather dark colored but brilliantly clear extract which is completely water soluble and which does not leave any undesirable coagulated residues when added particularly to aqueous oxidizable food compositions.

At the same time this extract has enhanced antioxygenic activity and may be readily used for addition to oxidizable aqueous food composition subject to oxidative deterioration.

Where drying of the extract is desired, the extract may be dried on trays preferably under a vacuum and in some instances spray on drum drying may be resorted to, but these latter methods are undesirable.

It has also been found satisfactory in connection with the drying of this extract to dry it in combination with cereals and cereal flours, seed flours, starch, sugar, salt and skim milk, which products may serve as carriers for the extract enabling these products to be more readily utilized for subsequent addition to other oxidizable compositions and they also appear to enhance the action of the extract itself as well as protecting the product thus treated against oxidative deterioration.

Where the extract is dried on sugar, it may be combined with the dry sugar crystals or with concentrated sugar syrup such as with molasses or mother liquors or with refined sugar syrups followed, where desired, by crystallization or centrifugal separation of the sugar crystals containing the extract applied thereto.

The extract may constitute as much as 40% to 70% against the total weight of the product against which it serves as a carrier or very small proportions may be applied such as no more than about 0.05% to 1% of the extract against the weight of the cereal, sugar, salt, etc.

With salt, the extract may be applied to the salt either in partly concentrated syrupy or pasty condition at a temperature of about 200° F. to 250° F. following which the balance of the water may be volatilized either at atmospheric pressure or under a vacuum.

The extract may similarly be combined with unconcentrated or concentrated whey or skim milk which, if desired, may be in caramelized condition and then the entire combination may be used in a concentrated or dried or pasty condition or evaporated to dryness and powdered.

Similar procedures may be used when the extract is combined with cereal flours, cereal flakes, starch or other types of cereal or seed material.

The extract may be utilized in amounts varying from 0.01% to as high as 5% particularly for addition to aqueous oxidizable food compositions such as milk, cream, ice cream, orange juice, lemon juice, grapefruit juice, beverages, essential oil aqueous emulsions and glyceride oil emulsions such as mayonnaise, salad dressings, etc.

The extract may also be utilized for combination with brines in the treatment particularly of fatty fish such as herring, mackerel, salmon, sardines, etc., in the curing of meats such as bacon, hams, etc., or in the manufacture of sausage or other fatty meats subject to oxidative deterioration.

The extracts may particularly be utilized for combination with breakfast cereals such as whole wheat flakes, corn flakes, oat flakes, or other breakfast cereals in which case they may be combined with the soup or mash prior to drying or applied as a spray on the finished rolled flakes before or after the drying operation or in any other manner in order to retard oxidative deterioration of the treated cereals.

Under these circumstances, it has been found particularly desirable for the pH of the finished extract to be not less than about 5.0 and preferably between about 4.0 and 4.5 and it has not been found desirable to adjust the pH of the finished alcohol purified extract to 5.2 or more where the extract is combined with a breakfast cereal or similar products.

Although this extract may be employed for direct addition to substantially pure glyceride or essential oils, the most desirable use for the present products are for addition to glyceride or essential oil containing oxidizable food compositions which may be either in aqueous condition or in substantially dry condition as it has been particularly found that the extract shows antioxygenic activity when applied to the aqueous or dried oxidizable food products.

The oat extract which is obtained by water extraction followed by alcohol purification may less preferably be further extracted with organic solvents, particularly after concentration to at least about 80% total solids and preferably after concentration to 90% total solids or to dryness.

Among the solvents that may thus be employed are included particularly substantially pure methanol, or iso-propyl alcohol; oil soluble solvents including hexane; acetone; methyl ethyl ketone; esters such as ethyl acetate, etc.

In the case of using methanol or iso-propyl alcohol, after admixing the solvents with the extract followed by filtration or separation of the alcohol soluble ingredients, the particular fraction to be utilized is the alcohol soluble fraction which may be separated from the alcohol insoluble fraction.

In the case of the oil soluble solvents such as hexane, however, the oil soluble fraction is not particularly desirable for utilization and the hexane insoluble fraction is that which may be utilized in accordance with the present invention.

In some instances where it is desired to reduce the carbohydrate content of the extract, dialysis procedures may be employed or even enzyme action may be utilized to solubilize the carbohydrates or to convert them into carbon dioxide or volatile materials which may be removed by subsequent evaporation or distillation procedures leaving behind a more concentrated product for use in accordance with the present invention.

In the first water extraction of the hard, non-starchy residues of the oats, the concentrated water extract that is obtained may form a jelly-like substance even when such extract contains as little as 10% to 15% total solids. Under these circumstances, the concentrated water extract containing as little as 10% to 15% total solids may be admixed with methanol or iso-propanol so that the amount of alcohol present amounts to between about 60% and 70% and the amount of water present amounts to between about 40% and 30%. Where the concentrated water extract of the oat residues becomes jelly-like at total solids of 10% to 15%, a much larger proportion of methanol or iso-propanol must be admixed with this extract in order to maintain the proper ratio of methanol or iso-propanol to water as referred to above.

Having described my invention, what I claim is:

1. A method of making an antioxidant which comprises extracting an oat product with water, adding to the extract a low molecular weight aliphatic alcohol and then removing the insoluble material.

2. A method of making an antioxidant which comprises extracting an oat product with water, adding to the extract with methanol and then removing the insoluble material.

3. A method of making an antioxidant which comprises treating an oat cereal with acidulated water, removing the oat residues, concentrating the clear soluble fraction, treating the concentrated soluble fraction with a low molecular weight aliphatic alcohol, removing the insoluble material, and then concentrating the alcohol soluble fraction to obtain an antioxygenic extract.

4. A method of making an antioxidant which comprises treating an oat cereal with acidulated water, removing the oat residues, concentrating the clear soluble fraction, treating the concentrated soluble fraction with methanol, removing the insoluble material, and then concentrating the methanol soluble fraction to obtain an antioxygenic extract.

5. A method of making an antioxidant which comprises treating an oat product with 4 to 9 parts of water to each one part of oats, adjusting the pH to between 3.5 and 5.5, agitating at a temperature of between 100° F. and 130° F., removing the oat residues, concentrating the clear soluble fraction to between 45% and 65% total solids, treating with between 4 parts and 8 parts of a low molecular weight aliphatic alcohol water mixture to each part of the total solids of the concentrated water extract, removing the insoluble material, and then concentrating the alcohol solution fraction to between 70% and 80% total solids to obtain an antioxygenic extract.

6. A method of making an antioxidant which comprises treating an oat product with 4 to 9 parts of water to each one part of oats, adjusting the pH to between 4 and 4.5, agitating at a temperature of between 120° F. and 125° F., removing the oat residues, concentrating the clear soluble fraction to between 45% and 65% total solids, treating with about 7 parts of a 60% low molecular weight aliphatic alcohol and 40% water mixture to each part of the total solids of the concentrated water extract, removing the insoluble material, and then concentrating the alcohol soluble fraction to between 70% and 80% total solids to obtain an antioxygenic extract.

7. A method of making an antioxidant which comprises treating an oat product with 4 to 9 parts of water to each one part of oats, adjusting the pH to between 4 and 4.5, agitating at a temperature of between 120° F. and 125° F., removing the oat residues, concentrating the clear soluble fraction to between 45% and 65% total solids, treating with about 7 parts of a 60% methanol and 40% water mixture to each part of the total solids of the concentrated water extract, removing the insoluble material, and then concentrating the methanol soluble fraction to between 70% and 80% total solids to obtain an antioxygenic extract.

8. A method of making a highly effective antioxidant which comprises preparing a water extract of finely divided unbleached oats, adding to the extract a low molecular weight aliphatic alcohol, removing the insoluble material and then concentrating the extract.

9. A method of treating aqueous extracts of oats to prepare antioxygenic materials therefrom suitable for addition to food compositions subject to oxidative deterioration which comprises removing constituents from said aqueous extracts of oats which are soluble in low molecular weight water miscible aliphatic alcohol by adding to the aqueous extracts a low molecular weight water miscible aliphatic alcohol and removing the insoluble material.

10. A method of retarding oxidative deterioration of food products normally subject thereto, which comprises extracting oats with water and then adding to the extract thereby obtained a low molecular weight aliphatic alcohol and removing the insoluble material, and then adding a small quantity of such extract after treatment with the alcohol to a food product normally subject to oxidative deterioration.

SIDNEY MUSHER.